United States Patent [19]

Di Salvo, Jr. et al.

[11] 4,198,476

[45] Apr. 15, 1980

[54] NONAQUEOUS SECONDARY CELL USING METAL OXIDE ELECTRODES

[75] Inventors: Francis J. Di Salvo, Jr., Florham Park; Donald W. Murphy, Warren, both of N.J.

[73] Assignee: Bell Telephone Laboratories, Incorporated, Murray Hill, N.J.

[21] Appl. No.: 940,722

[22] Filed: Sep. 8, 1978

[51] Int. Cl.$^2$ .............................................. H01M 4/48
[52] U.S. Cl. ..................................... 429/194; 429/218
[58] Field of Search ................ 429/194, 196, 197, 218

[56] References Cited

U.S. PATENT DOCUMENTS

| 3,655,585 | 4/1972 | Dey et al. | 252/506 |
| 3,873,369 | 3/1975 | Kamenski | 429/194 |

FOREIGN PATENT DOCUMENTS 7315069  11/1973  Japan ..................................... 429/194

OTHER PUBLICATIONS

Manganese Dioxide Symposium Proceedings 1, pp. 384–401 (1975).

*Primary Examiner*—Donald L. Walton
*Attorney, Agent, or Firm*—Richard D. Laumann

[57] ABSTRACT

Nonaqueous secondary cells are described utilizing electrically conductive rutile structure transition metal dioxides having a unit cell volume of at least 60 Å$^3$ and the nominal atom composition, MO$_2$ where M is at least one member selected from the group consisting of Ru, Os, Ir, Mo, W and V, as the active positive electrode material and lithium as the active negative electrode material.

10 Claims, 6 Drawing Figures

[001]

[001]

NONAQUEOUS SECONDARY CELL USING METAL OXIDE ELECTRODES

TECHNICAL FIELD

This invention deals with nonaqueous secondary cells.

BACKGROUND OF THE INVENTION

There has been considerable interest in recent years in nonaqueous secondary cells because of the possibilities afforded of obtaining cells useful for small electronic applications, such as calculators, watches and circuit boards, which overcome some of the drawbacks, e.g., self-discharge and low voltage, of the presently used nickel cadmium cells. Many materials have been considered as candidates for the electrode materials in such cells.

Particular attention has been given to those classes of materials that undergo topochemical reactions because of their potential utility as the positive electrode material in secondary cells. Broadly speaking, topochemical reactions involve a host lattice into which a guest species is inserted with the product of the host and guest maintaining the essential structural features of the host. If the structural changes are minimal, the process is termed intercalation and the overall reaction is likely to be readily reversible. If the reaction is of a redox type, the reversibility of the intercalation reaction may form the basis of a secondary cell.

Several classes of host materials have been identified as candidates for the positive electrode material in room temperature cells using an alkali metal, e.g., lithium or sodium, as the guest species and negative electrode material. One such class is formed by Van der Waal's bonded layered transition metal dichalcogenides in which the structural changes between $MX_2$ and $LiMX_2$; M=Group IVB, VB, VIB, X=S or Se; involve only a small separation of the $MX_2$ layers to accommodate the lithium or sodium atoms.

However, compounds containing sulfur or selenium are less desirable, other features being identical, than are compounds containing oxygen for at least two reasons. First, oxides weigh less than the sulfides and selenides and may permit higher energy densities both per unit weight and per unit volume. Second, oxides are typically less noxious and consequently are easier to work with than are sulfides.

Several metal oxides have been investigated as positive electrode materials in cells. For example, $MnO_2$ was studied by Ikeda et. al., *Manganese Dioxide Symposium Proceedings*, 1, 384, (1975); $WO_x$, where x is between 2.0 and 2.9, was studied by Kamenski, U.S. Pat. No. 3,873,369; and $V_2O_5$ was studied by Dey and Sullivan, U.S. Pat. No. 3,655,585.

While these studies indicate that metal oxides are promising candidates for positive electrode materials in nonaqueous cells, they are limited in scope. The materials were studied only as candidates for positive electrode materials in primary cells, and the studies did not recognize the importance of both the crystal and chemical structure of the electrode material for the construction of secondary cells.

SUMMARY OF THE INVENTION

It has been found that the transition metal dioxides having the rutile structure with a unit cell of at least 60 Angstroms[3] and which are electrically conductive are useful positive electrode materials in nonaqueous secondary cells using lithium containing negative electrodes. The metal dioxides have the nominal atom compositions, $MO_2$, where M is at least one member selected from the group consisting of Ru, Ir, Os, V, Mo and W. The size of the unit cell and the electrical conductivity of the metal dioxide have been found to be critical parameters controlling the incorporation of lithium into the host structure, which forms the active positive electrode material, and the reversibility of the intercalation process. It is believed that these parameters affect both the size of the lithium diffusion pathway and the number of sites available for the incorporated lithium. Especially promising transition metal dioxides include $RuO_2$, $IrO_2$ $OsO_2$, and $MoO_2$.

DETAILED DESCRIPTION

Figure 1:
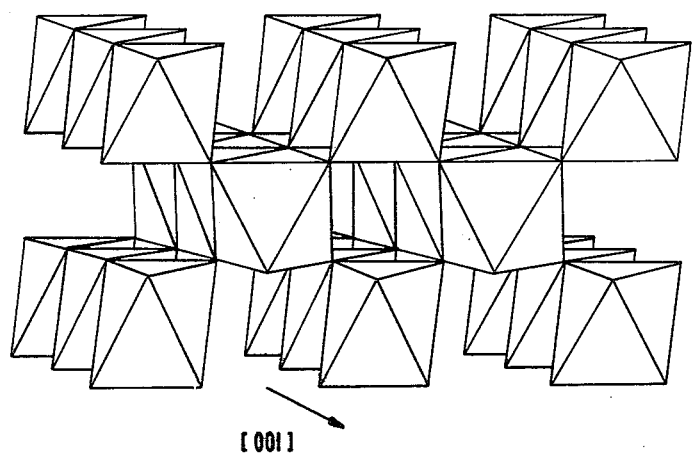
FIG. 1 depicts the rutile crystal structure.

The rutile crystal structure of the host, forming the active positive electrode material, is depicted in FIG. 1. It may be described generally as an hexagonal close packed oxygen lattice with octahedrally coordinated metal ions forming edge shared infinite chains along the [001] direction of the tetragonal cell. The chains are crosslinked by sharing corners to form an equal number of identical vacant channels. It is believed likely that incorporation of the lithium into the host takes place via these channels.

The structure may vary from the ideal structure depicted for some metals. For example, for a number of metals, such as V, Mo, W, Tc and Re, the unit cell structures of the metal dioxides are distorted due to the covalent bonding of pairs of metal ions along the [001] axis and tetragonal or monoclinic superlattices result. This strong metal-metal bonding is reflected in low c/a ratios. For example, the c/a ratio is 0.692 for $RuO_2$ and 0.577 for $MoO_2$. The latter compound contains a metal-metal bond and the former compound does not. The data in TABLE I show that upon lithiation, the c/a ratio decreases slightly for most lithiated rutiles, compared to the parent compound, and the volume of the fully lithiated unit cell increases between 10 percent and 20 percent over that of the unlithiated host unit cell. The c/a ratio decreased sharply for $RuO_2$ and $OsO_2$ upon lithiation thus indicating the formation of significant metal-metal bonding.

Both unit cell size and the electrical conductivity of the rutile have been found to be critical parameters when the metal dioxide is used as the active positive electrode material in a secondary cell.

The data in TABLE 1 show the importance of both the unit cell size and the change in unit cell size to easy lithiation. All of the compounds that permit easy lithiation have been found to have unit cells with a volume exceeding approximately 60 $A^3$. For $Mo_yV_{1-y}O_2$, y greater than or equal to 0.0 and less than or equal to 1.0, unit cell volume increases linearly with y and lithium incorporation takes place at room temperatures for y greater than or equal to approximately 0.2. Lithiation takes place even more readily if y is greater than or equal to 0.5. All the $Li_xMo_2$ rutile structure compounds formed have volumes of at least 70 $A^3$ for values of x approximately equal to or greater than 1.0.

TABLE 1

| Compound | C/a | V($A^3$) | ΔV/V |
|---|---|---|---|
| $RuO_2$ | 0.692 | 62.64 | |
| $Li_{1.3}RuO_2$ | 0.552 | 70.80 | 0.130 |
| $OsO_2$ | 0.708 | 64.36 | |
| $Li_{1.5}OsO_2$ | 0.541 | 74.45 | 0.157 |
| $IrO_2$ | 0.701 | 63.85 | |
| $Li_{1.5}IrO_2$ | 0.655 | 75.75 | 0.186 |
| $Mo_{0.5}V_{0.5}O_2$ | 0.616 | 61.66 | |
| $Li_{1.0}Mo_{0.5}V_{0.5}O_2$ | 0.551 | 71.43 | 0.158 |
| $MoO_2$ | 0.581 | 65.05 | |
| $LiMoO_2$ | 0.542 | 73.16 | 0.125 |
| $WO_2$ | 0.572 | 66.20 | |
| $Li_{1.0}WO_2$ | 0.533 | 73.22 | 0.106 |

That 60$A^3$ is a critical size for the nonlithiated structure is shown by examining compounds, not listed, having unit cell volumes less than approximately 60 $A^3$. For example, $CrO_2$ has a unit cell of 57.02 $A^3$ and can incorporate 0.8 lithium ions per unit cell but there are side reaction products present. A stable layered form of $LiCrO_2$ is known and has a unit cell volume of 78.5$A^3$, which is a 38 percent unit cell volume increase over rutile $CrO_2$. Rutile $MnO_2$ has a unit cell of 55.58 $A^3$ and incorporates lithium but the resulting product has the rock salt structure. The lithiated structure has a volume, for the same number of formula units, of 73.9 Angstroms for a 33 percent unit cell volume increase over the rutile $MnO_2$. Neither $CrO_2$ nor $MnO_2$ forms useful active positive electrode materials for secondary cells. The reason resides in the difficulty, if not impossibility, of maintaining the same crystal structure with such a large volume change. Identity of crystal structure before and after lithiation has been found crucial for easy reversibility and such identity is difficult to maintain if the difference in unit cell volume exceeds between the lithiated and nonlithiated structures 20 percent.

The rutile structure metal dioxides which incorporated lithium easily are all electrically conductive, i.e., they have electrical conductivities in excess of 100 $(\Omega cm)^{-1}$. The high electronic conductivity is believed to aid lithium incorporation by screening the coulomb repulsion between lithium ions. Thus, electrical conductivity should be as high as possible. In preferred embodiments, the positive electrode conductivity is at least 10,000 $(\Omega cm)^{-1}$. $RuO_2$, $OsO_2$ and $IrO_2$ have electrical conductivities within this range. The necessity of high electronic conductivity is shown by the inability of the nonmetallic rutiles, $TiO_2$ and $NbO_2$, to incorporate lithium. However, while high electronic conductivity is necessary for easy lithium incorporation, it is not sufficient to insure lithium incorporation. For example, $VO_2$, which has a unit cell volume of 58.97 $A^3$, does not incorporate lithium even at temperatures above the metal-insulator transition temperature at 69 degrees C. because of the small unit cell volume.

Thus, transition metal dioxides having the rutile crystal structure with a unit cell volume of at least 60 $A^3$ and which are electrically conductive are useful as the active positive electrode material in secondary cells in which lithium is the active negative electrode material. Transition metal is defined, for this application to include Groups VB through VIII of the Periodic Table. The active positive electrode material may be represented by the nominal atom formula $MO_2$ where M is a transition metal. In preferred embodiments, M is at least one member selected from the group consisting of Ru, Ir, Os, V, Mo and W. Cells exhibited no self-discharge over a two-week time period.

Cells may be constructed in any of the well-known and conventional structures in which the metal oxide positive electrode is spaced from a suitable negative electrode and both electrodes are in mutual contact with an electrically conductive nonaqueous electrolyte. The electrolyte should be nonreactive with both the positive and negative electrode materials. Suitable electrolytes include lithium perchlorate in propylene carbonate and lithium hexafluoroarsenate in dioxane. Suitable current collectors contact the positive and negative electrodes and permit an electrical current to be drawn by an external circuit.

The cell may be manufactured in either the charged or discharged state. If manufactured in the charged state, the metal dioxides forming the active positive electrode material may be formed by conventional techniques such as those described in "Handbook of Preparative Inorganic Chemistry", ed. G. Brauer, Academic Press, N.Y., N.Y. The cell may be manufactured in the discharged state by reacting rutile structure $MO_2$ with n-BuLi in hexane. The reaction results in substantial lithium incorporation and yields $Li_xMo_2$; $1.0 \leq x$.

Lithiation proceeds elecrochemically when the rutile is used as the active positive electrode material in cells having negative electrodes containing lithium. The cathodic reaction may be represented by the equation $xLi^+ + MO_2 + xe = Li_xMO_2$.

The invention will be illustrated by reference to examples. In all of the cells described as examples, the elecrolyte was lithium perchlorate in propylene carbonate. The term "cycled" means the cell was charged and discharged at the constant current stated.

EXAMPLE 1

Figure 2:
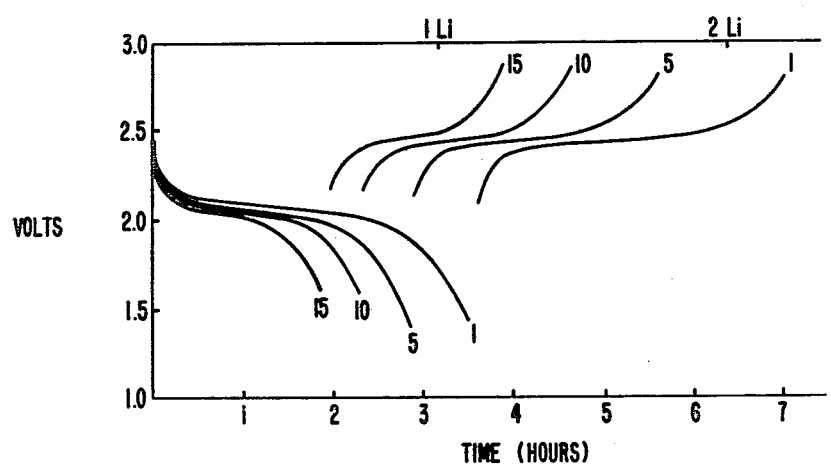
FIG. 2 plots on coordinates of time, in hours, and voltage, in volts, the cell voltage as a function of time for a cell using $RuO_2$ as the active positive electrode material.

FIG. 2 relates, for an $RuO_2$ positive electrode cell, cell voltage, in volts, on the ordinate, and both time in hours, and lithium content on the abscissa. The negative electrode was lithium. The cell contained 9.7 mg of $RuO_2$ and was cycled at 0.15 ma. The cycle numbers are indicated.

EXAMPLE 2

Figure 3:
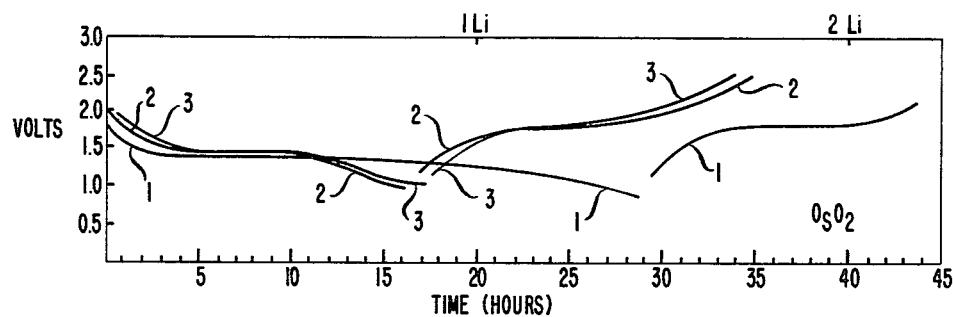
FIG. 3 plots, on coordinates of time, in hours, and voltage, in volts, the cell voltage as a function of time for a cell using $OsO_2$ as the active positive electrode material.

FIG. 3 relates, for an $OsO_2$ positive electrode cell, cell voltage, in volts, on the ordinate and both time, in hours and lithium content on the abscissa. The negative electrode was lithium. The cell contained 25.1 mg of $OsO_2$ and was cycled at 0.15 ma. The cycle numbers are indicated.

EXAMPLE 3

Figure 4:
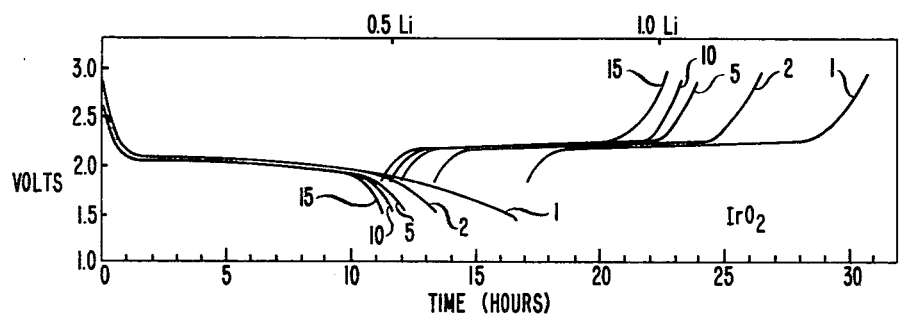
FIG. 4 plots, on coordinates of time, in hours, and voltage, in volts, the cell voltage as a function of time for a cell using $IrO_2$ as the active positive electrode material.

FIG. 4 relates, for an $IrO_2$ positive electrode cell, cell voltage, in volts, on the ordinate, and both both time, in hours, and lithium content on the abscissa. The negative electrode was lithium. The cell contained 28.4 mg of $IrO_2$ and was cycled at 0.15 mA. The cycle numbers are indicated.

EXAMPLE 4

Figure 5:
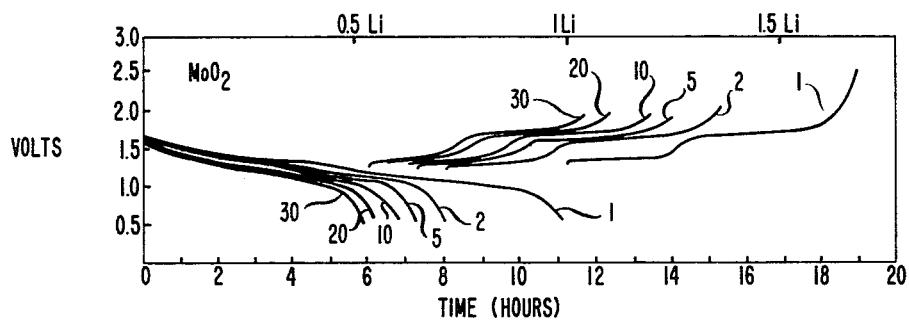
FIG. 5 plots, on coordinates of time, in hours, and voltage, in volts, the cell voltage as a function of time for a cell using $MoO_2$ as the active position electrode material.

FIG. 5 relates, for an $MoO_2$ positive electrode cell, cell voltage, in voltage, and time, in hours, and lithium content on the abscissa. The negative electrode was lithium. The cell contained 8.0 mg of $MoO_2$ and was cycled at 0.15 mA. The cycle numbers are indicated.

The voltages for the $RuO_2$, $OsO_2$ and $IrO_2$ cells are relatively constant throughout each cycle. X-ray data confirm the hypothesis that the nominal compositions $Li_xMO_2$, for M=Ru, Os and Ir, $1.0 \leq x$, are appropriate ratios of the limiting compositions $MO_2$ and $LiMO_2$. These rutiles clearly exceed one Li/M and since only one octahedral site per M is available, it is hypothesized the the lithium ions occupy some tetrahedral sites in the lithiated compounds.

The potential of lithiation for $WO_2$ is sufficiently low that cells may be constructed using $LiWO_2$ as the negative electrode material. The low potential of lithium intercalation offers possibilities of constructing cells that avoid the problem of poor lithium plating efficiency.

EXAMPLE 5

Figure 6:
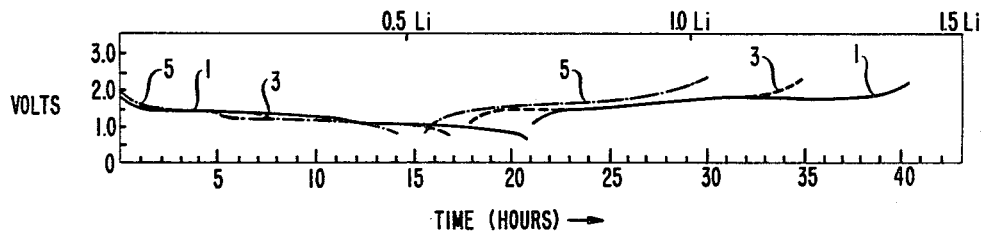
FIG. 6 plots, on coordinates of time, in hours, and voltage, in volts, the cell voltage as a function of time for a cell using $RuO_2$ as the active positive electrode material and $LiWO_2$ as the anode material.

FIG. 6 relates, for a cell having an $RuO_2$ positive electrode and a $LiWO_2$ negative electrode, cell voltage, in volts, on the ordinate, and both time, in hours, and lithium content on the abscissa. The cell contained 35.4 mg of $RuO_2$, 125 mg of $LiWO_2$ and was cycled at 0.25 mA. The cycle numbers are indicated.

This cell is amenable to an entirely solid state configuration. For example, standard sputtering techniques could be used to form the three layer thin film structure, $WO_2/LiNbO_3/RuO_2$. This structure could then be treated with n-BuLi to form a discharged $WO_2/LiNbO_3/LiRuO_2$ cell which could then be charged.

We claim:

1. A nonaqueous secondary cell comprising a negative electrode, an electrolyte, and a positive electrode: Characterized in that said positive electrode comprises an electrically conductive rutile structure transition metal dioxide, said metal dioxide has a nominal atom composition $MO_2$, M being at least one member selected from groups VB through VIII of the periodic table having a unit cell volume of at least 60 Angstroms$^3$.

2. A nonaqueous secondary cell as recited in claim 1 in which said M is at least one member selected from the group consisting of Ru, Os, Ir, Mo, W and V.

3. A nonaqueous secondary cell as recited in claim 1 or 2 in which said electrolyte consists of lithium perchlorate in propylene carbonate.

4. A nonaqueous secondary cell as recited in claim 1 or 2 in which said negative electrode comprises lithium.

5. A nonaqueous secondary cell as recited in claim 2 in which M is $Mo_y V_{1-y}$, y greater than or equal to approximately 0.2 and less than 1.0.

6. A nonaqueous secondary cell as recited in claim 4 in which said negative electrode comprises $LiWO_2$.

7. A nonaqueous secondary cell as recited in claim 6 in which M is Ru.

8. A nonaqueous secondary cell as recited in claim 1 in which said positive electrode has an electrical conductivity of at least 10,000 $(\Omega cm)^{-1}$.

9. A nonaqueous secondary cell as recited in claim 8 in which said transition metal dioxide is selected from the group consisting of $RuO_2$, $OsO_2$, $IrO_2$ and $MoO_2$.

10. A nonaqueous secondary cell as recited in claim 8 or 9 in which said electrolyte consists of lithium perchlorate in propylene carbonate.

* * * * *